(12) United States Patent
 Takaoka

(10) Patent No.: US 11,366,993 B2
(45) Date of Patent: Jun. 21, 2022

(54) MANAGEMENT APPARATUS, METHOD, AND MEDIUM FOR DECIDING HOW MANY INK TANKS A USER SHOULD CARRY BASED ON USAGE INFORMATION

(71) Applicant: Canon Kabushiki Kaisha, Tokyo (JP)

(72) Inventor: Tsubasa Takaoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/158,350

(22) Filed: Jan. 26, 2021

(65) Prior Publication Data

US 2021/0232878 A1 Jul. 29, 2021

(30) Foreign Application Priority Data

Jan. 28, 2020 (JP) .............................. JP2020-011513

(51) Int. Cl.
 *G06K 15/00* (2006.01)
 *G06F 3/12* (2006.01)
 *H04N 1/00* (2006.01)
(52) U.S. Cl.
 CPC ......... *G06K 15/4075* (2013.01); *G06F 3/121* (2013.01); *G06F 3/1203* (2013.01); *G06F 3/1219* (2013.01); *G06F 3/1229* (2013.01); *H04N 1/00042* (2013.01); *H04N 1/00061* (2013.01); *H04N 1/00344* (2013.01)
(58) Field of Classification Search
 None
 See application file for complete search history.

(56) References Cited

U.S. PATENT DOCUMENTS

| 2012/0148267 A1* | 6/2012 | Kawai | ................ | G03G 15/5079 |
| | | | | 399/8 |
| 2014/0211232 A1* | 7/2014 | Ganesan | .................. | G06F 3/12 |
| | | | | 358/1.14 |
| 2018/0081608 A1* | 3/2018 | Tamura | ................ | G06F 3/1239 |

(Continued)

FOREIGN PATENT DOCUMENTS

JP 2016129974 A 7/2016

*Primary Examiner* — Miya J Williams
(74) *Attorney, Agent, or Firm* — Venable LLP

(57) ABSTRACT

Provided is a management apparatus includes: an acquisition unit acquiring remaining-quantity information indicating a remaining quantity of a consumable included in the image forming apparatus; a database storing the remaining-quantity information and image forming apparatus identification information in association with each other, and storing user identification information and a usage history of the image forming apparatus by the user in association with each other; a calculation unit reading the usage history from the database based on externally-designated user identification information, calculating a predicted usage quantity of the consumable in an image forming apparatus having externally-designated apparatus identification information based on the read usage history, reading the remaining-quantity information from the database based on the externally-designated apparatus identification information, generating required information on the consumable based on the read remaining-quantity information and the calculated predicted usage quantity; and a notification unit notifying the required information generated by the calculation unit.

13 Claims, 16 Drawing Sheets

(56) References Cited

U.S. PATENT DOCUMENTS

| | | | |
|---|---|---|---|
| 2020/0041944 A1* | 2/2020 | Hiraike | G03G 15/556 |
| 2020/0326896 A1* | 10/2020 | Shramm | G06F 11/3442 |
| 2021/0073605 A1* | 3/2021 | Fukaya | H04N 1/2315 |
| 2021/0232877 A1* | 7/2021 | Shibasaki | G06N 5/04 |

* cited by examiner

FIG. 3

| USER ID (UID) | DATA ADDRESS (DA) | VARIATION REFERENCE VALUE (CV) | INK QUANTITY CORRECTION COEFFICIENT ($\alpha$) | NUMBER OF PRINT PAGES CORRECTION COEFFICIENT ($\beta$) |
|---|---|---|---|---|
| nakata0620 | 0x0000E00A | 1.1 | 1.0 | 1.0 |
| saito0822 | 0x0000E04C | 1.05 | 1.5 | 1.5 |
| ⋮ | ⋮ | ⋮ | ⋮ | ⋮ |
| saito1204 | 0x0000E0BF | 1.2 | 1.2 | 1.0 |

FIG. 4

| USED MODEL ID (UPID) | USED MODEL TYPE (UPtype) | NUMBER OF PRINT PAGES (pages) | INK USAGE QUANTITY (q) | | | | INK TANK SIZE (mv) | DATE AND TIME OF USE (Date) |
|---|---|---|---|---|---|---|---|---|
| | | | Bk | C | Bk | Y | ... | |
| cat | type-B | 15 | 0.5 | 0.3 | 0.2 | 0.2 | ... | XL | 20xx/xx/xx ○○:○○ |
| rabit | type-A | 18 | 0.6 | 0.4 | 0.3 | 0.3 | ... | STD | 20xx/yy/yy △△:△△ |
| ... | ... | ... | | | | | | ... | ... |
| dog | type-B | 36 | 1.1 | 0.8 | 0.5 | 0.6 | ... | STD | 20xx/ww/ww ○○:○○ |
| cat | type-B | 24 | 0.8 | 0.5 | 0.3 | 0.4 | ... | XL | 20xx/zz/zz △△:△△ |

FIG. 5

| PRINTER ID (PID) | ADDRESS (address) | SERIAL NUMBER (Snum) | MODEL TYPE (Ptype) | INK TYPE (Itype) | INK REMAINING QUANTITY (rq) | | | | | CUMULATIVE NUMBER OF PRINT PAGES (TP) | LAST DATE AND TIME OF USE (LastDate) | STATE (State) | USER (User) |
|---|---|---|---|---|---|---|---|---|---|---|---|---|---|
| | | | | | Bk | C | Bk | Y | ... | | | | |
| rabit | xxxxxxxa | aaaaaaaa | type-A | BCI◎◎◎ | 9.9 | 6.5 | 3.3 | 4.1 | ... | 52 | 20xx/xx/xx/xxxx | RENTED | saito0822 |
| dog | xxxxxxxc | cccccccc | type-B | BCI△△ | 4.4 | 2.6 | 2.9 | 2.7 | ... | 100 | 20xx/yy/yy/yyyy | RETURNED | - |
| ... | ... | ... | ... | ... | | | ... | | | ... | ... | ... | ... |
| swan | xxxxxxxc | ssssssss | type-B | BCI△△ | 8.7 | 6.0 | 5.8 | 5.2 | ... | 12 | 20xx/vv/vv/vvvv | RETURNED | - |
| cat | xxxxxxxd | tttttttt | type-C | BCI○○○ | 10 | 6 | 6 | 6 | ... | 0 | - | RENTED | saito1204 |

FIG. 6

| INK TANK TYPE (Itype) | SIZE (v) | INK QUANTITY (nq) |
|---|---|---|
| BCI○○○ | STD | ○○g |
| BCI○○○ | XL | ΔΔg |
| ⋮ | ⋮ | ⋮ |
| BCI◎◎◎ | XL | ΔΔg |

MANAGEMENT APPARATUS, METHOD, AND MEDIUM FOR DECIDING HOW MANY INK TANKS A USER SHOULD CARRY BASED ON USAGE INFORMATION

BACKGROUND OF THE INVENTION

Field of the Invention

The present disclosure relates to a management apparatus and a management system.

Description of the Related Art

In Japanese Patent Application Laid-Open No. 2016-129974, there is disclosed a printing system configured to acquire an ink consumption quantity in printing to be executed based on a printing job and to acquire an ink remaining quantity in a cartridge. In the printing system, the ink consumption quantity and the ink remaining quantity are displayed on a display unit. Therefore, a user can estimate the ink quantity required for the printing expected to be executed by checking on the display unit the ink consumption quantity in printing executed in the past. The user can then determine whether or not a cartridge is required to be exchanged by comparing the estimation result with the ink remaining quantity displayed on the display unit.

Incidentally, a user who uses a mobile printer may wish to reduce the number of consumables he or she carries. In order to achieve this, the user is required to predict the quantity of a consumable (required quantity) required when he or she is to use the mobile printer, and to minimize the number of consumables as spares or for exchange to as few as possible. Further, in a usage method of centrally managing a plurality of shared mobile printers and renting out the mobile printers as required, one printer is used by an unspecified number of users. In this case, a usage situation differs depending on the user, and therefore there is a problem in that it is difficult to accurately predict the usage quantity of the consumable of each user from a usage history of the printer as disclosed in Japanese Patent Application Laid-Open No. 2016-129974.

SUMMARY OF THE INVENTION

An object of the present disclosure is to provide a management apparatus, a management system, a management method, and a program which can perform notifications corresponding to each of a plurality of users who use an image forming apparatus in relation to a consumable included in the image forming apparatus.

According to the present disclosure, there is provided a management apparatus including: an acquisition unit configured to acquire, from an image forming apparatus, remaining-quantity information indicating a remaining quantity of a consumable included in the image forming apparatus; a database configured to store the remaining-quantity information acquired by the acquisition unit and apparatus identification information for identifying the image forming apparatus in association with each other, and to store user identification information for identifying a user and a usage history of the image forming apparatus by the user in association with each other; a calculation unit configured to read the usage history from the database based on externally-designated user identification information, to calculate a predicted usage quantity of the consumable in an image forming apparatus having externally-designated apparatus identification information based on the read usage history, to read the remaining-quantity information from the database based on the externally-designated apparatus identification information, and to generate required information on the consumable based on the read remaining-quantity information and the calculated predicted usage quantity; and a notification unit configured to notify the required information generated by the calculation unit.

Further features of the present invention will become apparent from the following description of exemplary embodiments with reference to the attached drawings.

BRIEF DESCRIPTION OF THE DRAWINGS

FIG. 3 is a table for showing an example of user information on a user registered in a database.

FIG. 4 is a table for showing an example of a usage history table of a user stored in a database.

FIG. 5 is a table for showing an example of printer information stored in a database.

FIG. 6 is a table for showing an example of ink tank information stored in a database.

DESCRIPTION OF THE EMBODIMENTS

Now, a detailed description is made of an embodiment of the present disclosure with reference to the drawings. Components described in this embodiment are given as examples of components forming the present disclosure, but the scope of the present disclosure is not limited to those components.

<Overall Configuration>

Figure 1:
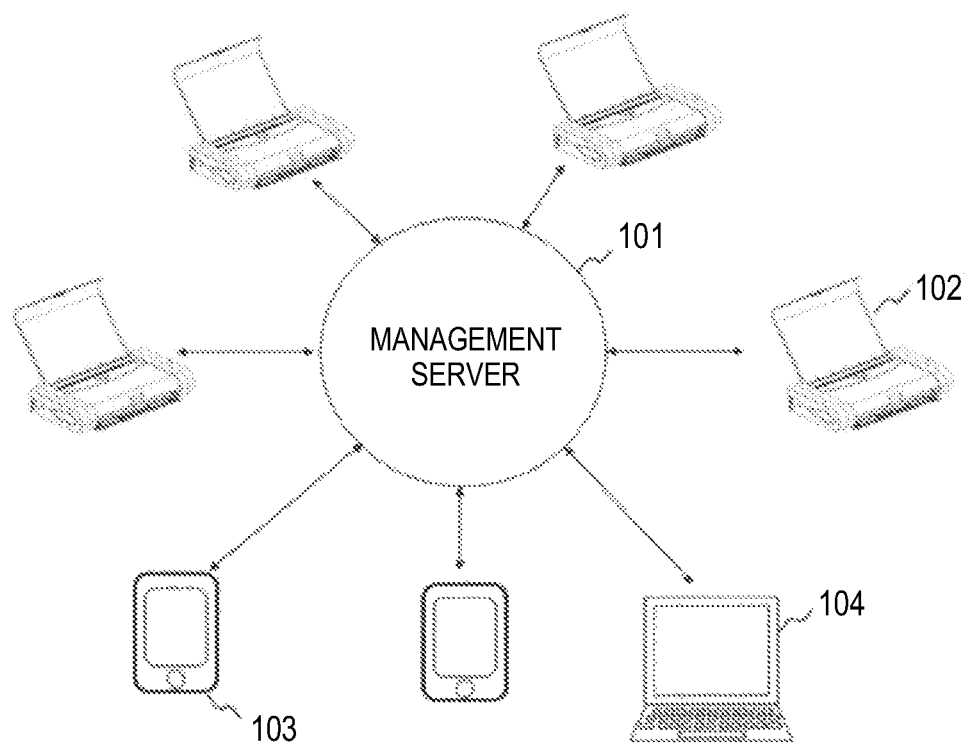
FIG. 1 is a diagram for illustrating a management system according to one embodiment of the present disclosure.

FIG. 1 is a diagram for illustrating a management system according to one embodiment of the present disclosure. A management server 101 is a management apparatus configured to perform communication to and from a mobile printer 102, a mobile terminal 103, and a stationary terminal 104 as required. The mobile printer 102 is an image forming apparatus. A case in which the mobile printer 102 is, for example, an inkjet mobile printer is described here, but the present disclosure is not limited to this. Further, the mobile terminal 103 and the stationary terminal 104, which are communication terminals, are each an example of a communication terminal, but may each be a communication device, for example, a laptop personal computer, a smartphone, or a tablet terminal.

Figure 2:
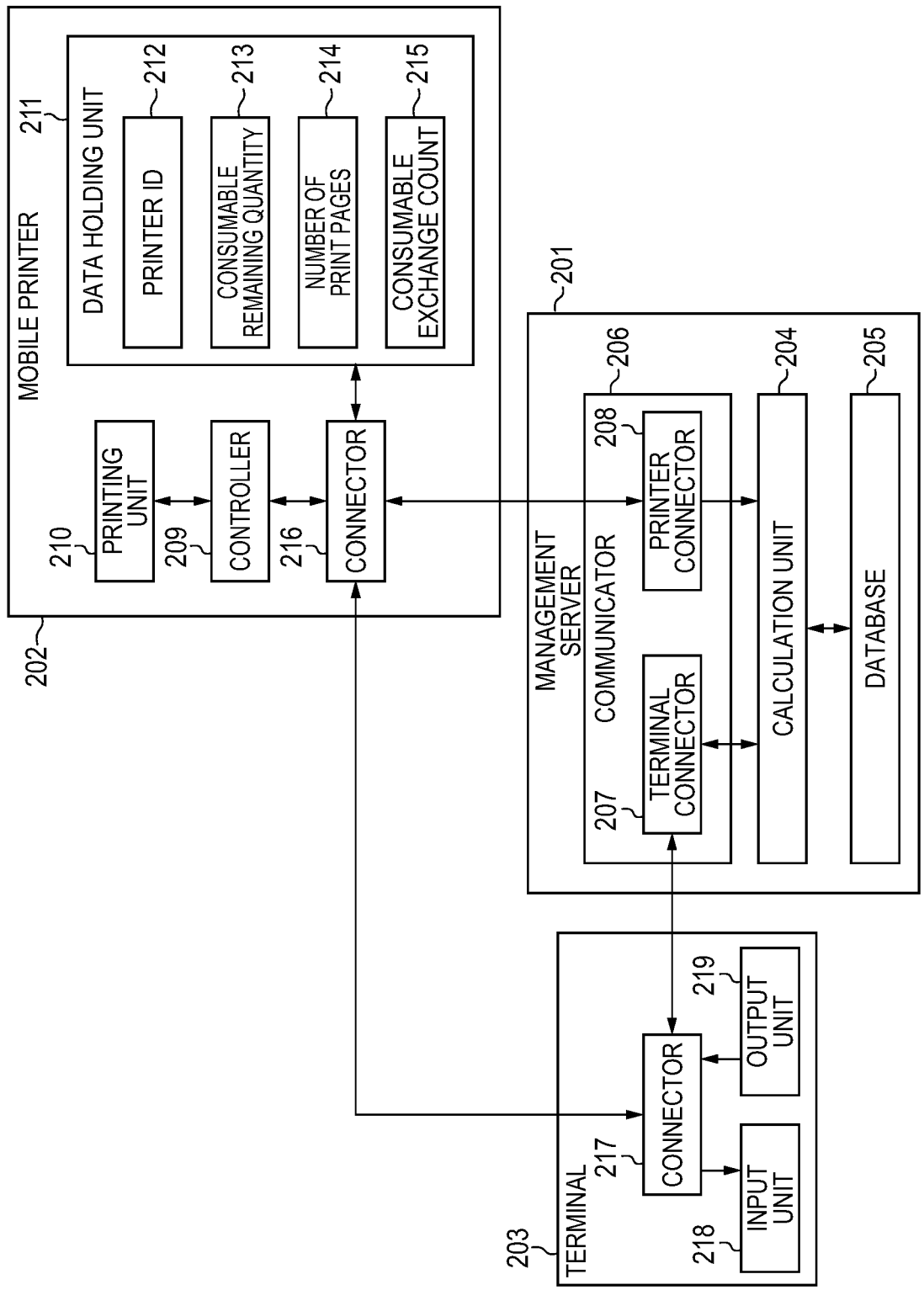
FIG. 2 is a block diagram of the management system of the present disclosure.

FIG. 2 is a block diagram for illustrating an example of components included in each apparatus forming the management system of the present disclosure. The management system illustrated in FIG. 2 includes a management server 201, a mobile printer 202, and a terminal 203. The management server 201 corresponds to the management server 101 illustrated in FIG. 1. The mobile printer 202 corresponds to the mobile printer 102 illustrated in FIG. 1. The terminal 203 corresponds to the mobile terminal 103 or the stationary terminal 104 illustrated in FIG. 1.

As illustrated in FIG. 2, the management server 201 includes a calculation unit 204, a database 205, and a communicator 206. The communicator 206 includes a terminal connector 207 and a printer connector 208. The calculation unit 204 is configured to access the database 205 to acquire or rewrite data based on data acquired from the terminal 203 and the mobile printer 202. The database 205 is configured to store the information on the user using the terminal 203 and information on the mobile printer 202. The information stored in the database 205 is described in detail later. The terminal connector 207 is configured to transmit and receive information to and from the terminal 203. The printer connector 208 is configured to transmit and receive information to and from the mobile printer 202.

As illustrated in FIG. 2, the mobile printer 202 includes a controller 209, a printing unit 210, a data holding unit 211, and a connector 216. The data holding unit 211 is configured to hold information indicating a printer ID 212, a consumable remaining quantity 213, a number of print pages 214, and a consumable exchange count 215. The controller 209 is configured to control the printing unit 210 which actually performs printing. The connector 216 is configured to transmit and receive information to and from the management server 201 and the terminal 203. As used herein, the term "consumable" refers to printing ink.

As illustrated in FIG. 2, the terminal 203 includes a connector 217, an input unit 218, and an output unit 219. The connector 217 is configured to transmit and receive information to and from the management server 201 and the mobile printer 202. The input unit 218 is configured to input information based on an operation by a user external to the terminal 203. The output unit 219 is configured to output information (notifications) transmitted from the management server 201 and the mobile printer 202. When the output unit 219 is a display having a touch panel function, the output unit 219 also acts as the input unit 218.

<Initial Setting>

When the terminal 203 is operated by the user, the terminal 203 accesses the management server 201 based on the operation received by the input unit 218. As an initial setting of this management system, information on the user, the printer, and ink tank(s) is required to be registered in the management server 201. The registration is performed by using the terminal 203 (in the mode illustrated in FIG. 1, the mobile terminal 103 or the stationary terminal 104). The registered information is stored in the database 205 of the management server 201.

FIG. 3 is a table for showing an example of user information on a user registered in the database illustrated in FIG. 2. As shown in FIG. 3, a user ID (UID) and parameters for calculating a required consumable quantity are stored in the database 205 in association with each other as user information (a user table). The user ID (UID) is user identification information which is set based on an operation by the user, and is freely and uniquely determined to identify the user. In the example shown in FIG. 3, the parameters for calculating the required consumable quantity are a variation reference value (CV), an ink quantity correction coefficient ($\alpha$), and a number of print pages correction coefficient ($\beta$). When user information is registered, the management server 201 stores the user information in the database 205 in association with a data address (DA) in the database 205 in which the data table (usage history table) indicating a usage history of the user is recorded.

FIG. 4 is a table for showing an example of the usage history table of a user stored in the database 205 illustrated in FIG. 2. That is, the number of the tables shown in FIG. 4 is equal to the number of users. As shown in FIG. 4, a used model ID (UPID), a used model type (UPtype), a number of print pages (pages), an ink usage quantity (q), an ink tank size (mv), and a date and time of use (Date) are stored in the database 205 in association with each other. The used model ID (UPID) is identification information on a model used by the user. The used model type (UPtype) indicates the type of the model used by the user. The number of print pages (pages) indicates the number of pages that have been printed when the user used the model. The ink usage quantity (q) is the quantity of ink that has been used when the user used the model, and is stored for each type of ink, for example, Bk, C, M, and Y The ink tank size (my) indicates the size of the ink tank mounted on the model used by the user. The date and time of use (Date) literally indicates the date and time when the user used the model. A usage history is stored in the database 205 for each user.

FIG. 5 is a table for showing an example of printer information (printer table) stored in the database 205 illustrated in FIG. 2. In FIG. 5, a printer ID (PID), an address (address), a serial number (Snum), a model type (Ptype), an ink type (Itype), an ink remaining quantity (rq), a cumulative number of print pages (TP), a last date and time of use (LastDate), a state (State), and a user (User) are stored. The printer ID (PID) is printer identification information for identifying the printer and is uniquely assigned to the printer. The address (address) is the address used to connect to (access) the printer. The serial number (Snum) is the serial number of the printer, and is information acquired by the management server 201 from the mobile printer 202. The model type (Ptype) is the type of model of the printer, and is information acquired by the management server 201 from the mobile printer 202. The ink type (Itype) is the type of the ink used in the printer, and is information acquired by the management server 201 from the mobile printer 202. The ink remaining quantity (rq) is information indicating the current quantity of ink mounted on the printer, and is information acquired by the management server 201 from the mobile printer 202. The cumulative number of print pages (TP) is information indicating the cumulative number of pages of the print media printed by the printer in the past, and may be information acquired by the management server 201 from the mobile printer 202. Further, the cumulative number of print pages (TP) may be calculated based on the number of print pages acquired from the mobile printer 202. The last date and time of use (LastDate) is information indicating the date and time of the last usage by the user, and is information acquired by the management server 201 from the mobile printer 202. The state (State) is information indicating a usage state of the printer. When a user is carrying the printer (printer is in use), the state is "rented," and when the printer is not being carried by a user (printer is not in use), the state is "returned." The user (User) is user identification information on the user who is using the printer. The management server 201 communicates to and from the mobile printer 202, and acquires from the mobile printer 202 the serial number (Snum), the address (address) for communication, the model type (Ptype), the ink type (Itype), and the ink remaining quantity (rq). Further, the management server 201 may automatically search and acquire the model type (Ptype) and the ink type (Itype) from the Internet, for example, based on the serial number (Snum), or may acquire the model type (Ptype) and the ink type (Itype) from input based on an external operation by, for example, a maintenance person or an administrator. The communication to and from the mobile printer 202 may be performed by using, for example, Wi-Fi (trademark), Near Field Communication (NFC), a wired local area network (LAN), or a universal serial bus (USB) cable. Information on the ink tank may be automatically acquired when the ink type registered in the printer is set, and the size of the ink tank may be acquired from input based on an external operation by, for example, a maintenance person or an administrator.

FIG. 6 is a table for showing an example of ink tank information stored in the database 205 illustrated in FIG. 2. As shown in FIG. 6, the database 205 stores an ink tank type (Itype), a size (v), and an ink quantity (nq) in association with each other as an ink tank table. The ink tank type (Itype) is the type of the ink tank. The size (v) is information indicating the size of the ink tank. The ink quantity (nq) is information indicating the quantity of ink contained in the ink tank when the ink tank has not yet been used.

When a user having a small usage count or a user who is not registered uses the management system of the present disclosure, the number of pieces of data required for calculation is not sufficient. Therefore, it is difficult to predict a required consumable quantity in relation to use by such users. In preparation for such a situation, standard data and a standard number of print pages can be registered in advance in the management server 201. The standard data can be registered in the management server 201 by using the mobile printer 202 to actually print the standard data under a state in which the management server 201 and the mobile printer 202 are in communication with each other, and measuring the ink consumption quantity at that time. As another example, the standard data may be registered based on an external operation by, for example, a maintenance person or an administrator registering known data regarding an ink ejection amount and inputting the ink consumption quantity. The standard number of print pages may be set individually by the user, or may be a unified value for the entire management system.

<Management System Communication Before Using Printer>

Figure 7:
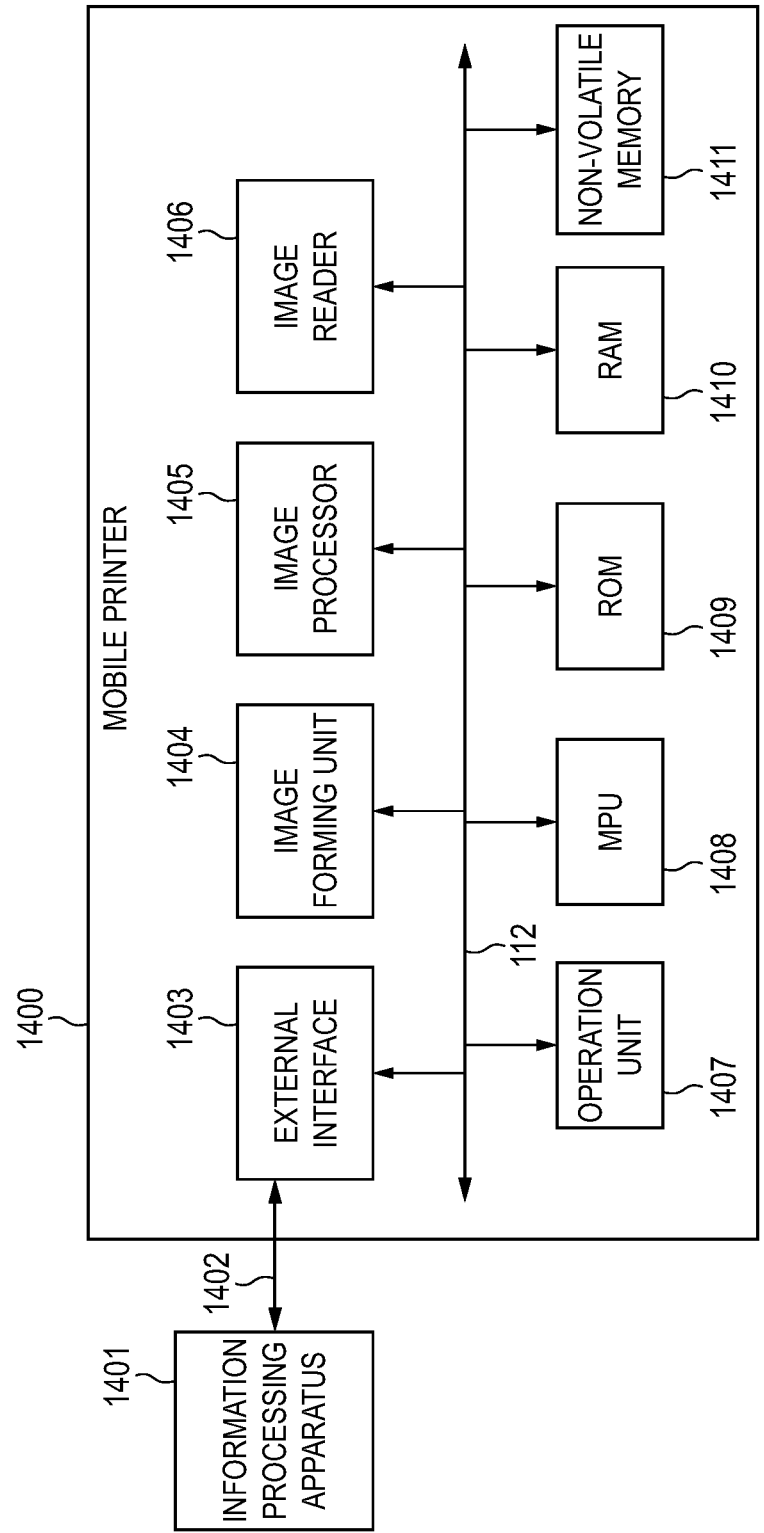
FIG. 7 is a block diagram for illustrating in detail a configuration of a mobile printer.

FIG. 7 is a block diagram for illustrating in detail a configuration of the mobile printer 202, which is the image forming apparatus illustrated in FIG. 2. A mobile printer 1400 illustrated in FIG. 7 corresponds to the mobile printer 202 illustrated in FIG. 2. The mobile printer 1400 is a mobile printer having a function as a scanner and a function as a printer in addition to a copy function. As illustrated in FIG. 7, the mobile printer 1400 includes the illustrated components from an external interface 1403 to a non-volatile memory 1411. The components 1403 to 1411 are connected to each other via an internal bus 112. The external interface 1403 is connected to an information processing apparatus 1401 via an external bus 1402. In this embodiment, as an example, there is described a case in which the external bus 1402 is a USB cable, but a network connection capable of connecting to a plurality of external devices or another interface may also be used.

An MPU 1408 is a processor configured to control the mobile printer 1400 by using a computer program (hereinafter referred to as "program"). A read-only memory (ROM) 1409 is a memory configured to store programs to be run by the MPU 1408 and permanent data. A random-access memory (RAM) 1410 is a rewritable working memory configured to hold data which is lost when the power to the mobile printer 1400 is turned off. A non-volatile memory 1411 is a rewritable memory configured to permanently store data which is not lost even when the power to the mobile printer 1400 is turned off. An operation unit 1407 is a user interface including an operation panel for receiving various operation instructions performed by an operator of the mobile printer 1400 and an image display unit. An image reader 1406 includes an image sensor in which a light source for radiating light onto a document and an element for reading and photoelectrically converting reflected light are arranged, and an image sensor unit configured to read the document. The image reader 1406 is configured to perform analog/digital (A/D) conversion of an analog electric signal output from the image sensor unit, perform characteristic correction in accordance with an image sensor device, and to generate digital image data. The image reader 1406 also includes a circuit configured to perform direct memory access (DMA) transfer for storing the generated digital image data in the RAM 1410. In this way, the image reader 1406 reads the document by using the image sensor, sequentially processes the output analog electric signals, and stores the processed data in the RAM 1410 as one piece of digital image data. An image processor 1405 is configured to read the image data stored in the RAM 1410, and to perform various type of image processing for improving image quality and image conversion processing for image formation. The image processor unit 1405 is also configured to perform processing of reading the image data stored in the RAM 1410, encoding the image data by using a JPEG method, for example, and decoding the encoded data.

When the mobile printer 1400 is used as a scanner, in the case of reading a document by using an automatic document feeder, the image reader 1406 first reads the document placed on a document stacking portion and converts the read document into an analog electric signal. Then, the image reader 1406 performs A/D conversion and characteristic correction, and writes (stores) the digital signal as image data in the RAM 1410. The image processor 1405 performs JPEG encoding of the image data written in the RAM 1410 by the image reader 1406, and stores the encoded data in the RAM 1410. Next, the external interface 1403 transmits the encoded data to the information processing apparatus 1401 via the external bus 1402. The information processing apparatus 1401 stores the transmitted encoded data as an image file in a storage device included in the information processing apparatus 1401. A JPEG method is mentioned here for description as an example of the encoding method, but the present disclosure is not limited to JPEG encoding, and other encoding methods may be used, or the image data may be transmitted to the information processing apparatus 1401 without using the image processor 1405 to perform encoding.

When a document copy function of the mobile printer 1400 is used, the processing until the RAM 1410 stores the encoded data of the document is the same as that performed when the mobile printer 1400 is used as a scanner. The image processor 1405 decodes the encoded data and performs various types of image processing on the image data. An image forming unit 1404 ejects liquid (ink) from recording heads based on print data to form a copy of the document on a recording medium. Here, a method of storing the read document as encoded data in the RAM 1410 is described as an example, but the image may be stored in the RAM 1410 and the image processor 1405 may perform various types of image processing without encoding the image.

Figure 8:
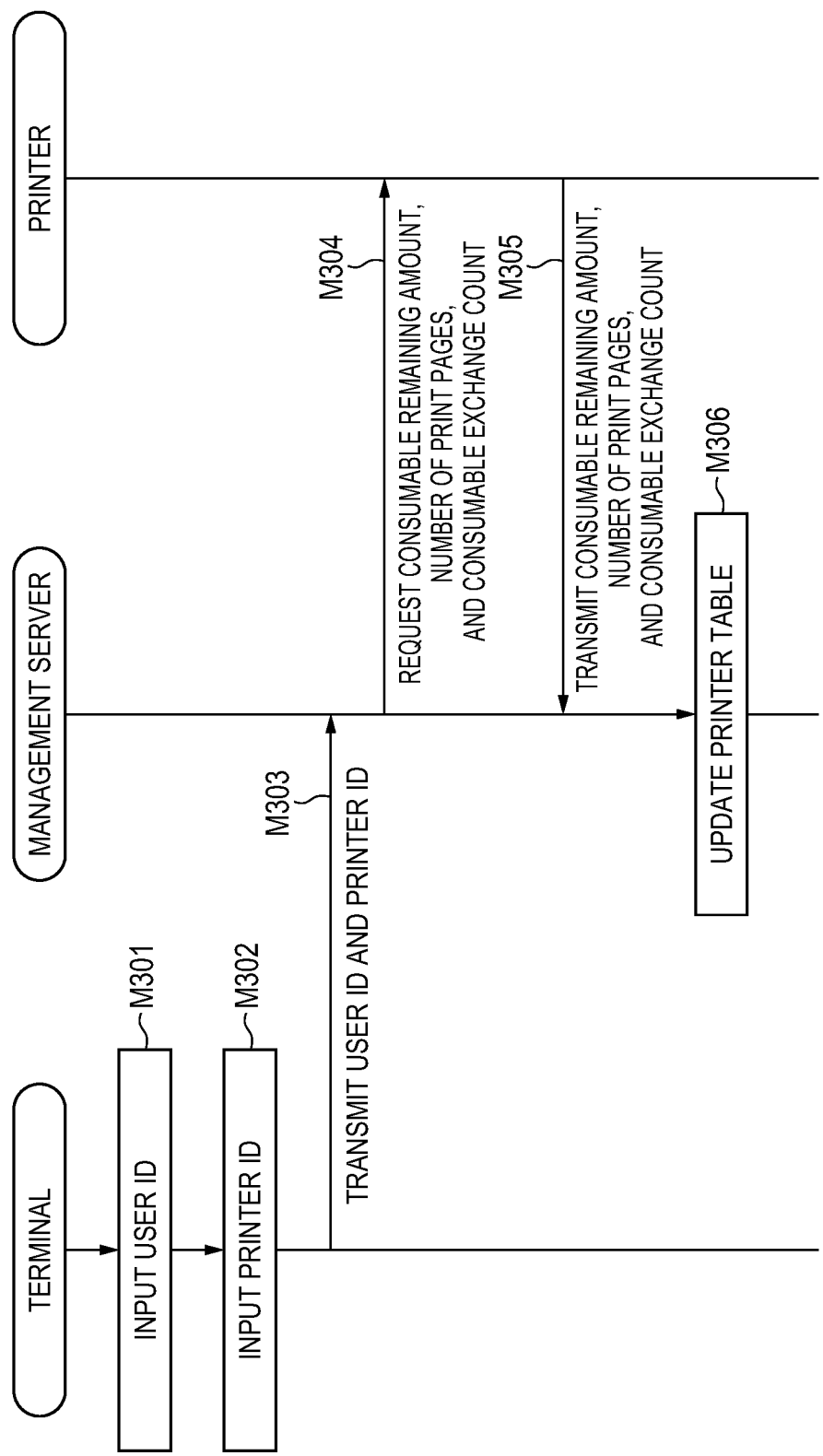
FIG. 8 is a sequence diagram for illustrating setting processing to be performed in advance.

FIG. 8 is a sequence diagram for illustrating setting processing to be performed in advance. The terminal of the sequence diagram illustrated in FIG. 8 represents the terminal 203 illustrated in FIG. 2, the management server of the sequence diagram represents the management server 201 illustrated in FIG. 2, and the printer of the sequence diagram represents the mobile printer 202 illustrated in FIG. 2. The user operates the terminal to input the user ID (UID) uniquely assigned to the user and the printer ID (PID) for identifying the printer to be used (Step M301 and Step M302). The method of inputting the user ID (UID) may be, for example, a method in which the user operates an input screen displayed by the terminal to directly input the user ID (UID), a method of using voice recognition for recognizing a voice input from the user, or a method of using fingerprint authentication of the user. Examples of the method of inputting the printer ID (PID) include the following methods. A label sticker indicating the printer ID (PID) may be attached to the printer, and the user may directly input the printer ID (PID) on an input screen displayed by the terminal while looking at the label sticker. As another example, the serial number (Snum) of the printer may be transmitted from the printer to the connector of the terminal by using the Near Field Communication (NFC communication), and the serial number may be converted into the printer ID (PID) by using a printer table included in the management server. As yet another example, a two-dimensional code, for example, a Quick Response (QR) code (trademark), may be attached to the printer, and the terminal may read the code. The terminal transmits the input user ID and printer ID to the management server (Step M303). The management server identifies the printer ID (PID), communicates to and from the printer based on the address corresponding to the printer ID (PID), and requests the consumable remaining quantity, the number of print pages, and the consumable exchange count (Step M304). The printer transmits information indicating the consumable remaining quantity, the number of print pages, and the consumable exchange count to a monitoring server (Step M305). The management server updates the consumable remaining quantity and the number of print pages stored in the printer table of the database (Step M306).

<From I/O Screen Startup to User Usage History Extraction>

Figure 9:
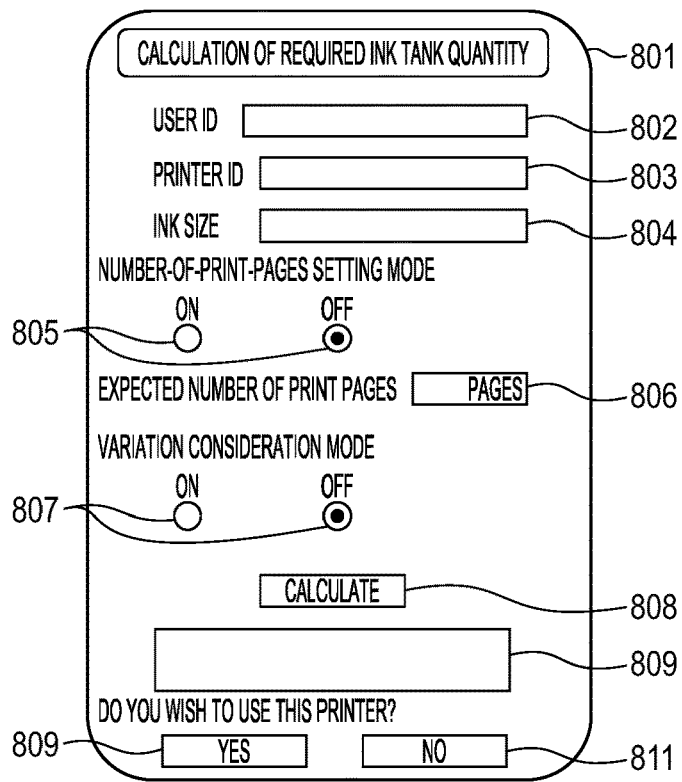
FIG. 9A, FIG. 9B, and FIG. 9C are each a diagram for illustrating an example of an input/output screen displayed by a terminal.

FIG. 9A to FIG. 9C are diagrams for illustrating an example of an input/output screen displayed by the terminal. FIG. 9A is a diagram for illustrating an example of the input/output screen before the user inputs information. When the user operates the terminal to activate software for the management system installed in advance in the terminal, the terminal displays an input/output screen 801. Next, the user operates the terminal to input the user ID (UID), the printer ID (ID), and the ink tank size (v) expected to be carried by the user in a user ID input window 802, a printer ID input window 803, and an ink tank size input window 804, respectively. A radio button 805 for setting a setting mode of the number of print pages and a radio button 807 for setting a variation consideration mode are set to OFF by default. When the radio button 805 for setting the setting mode of the number of print pages is turned ON, information can be input to an expected number of print pages setting window 806, and the user inputs the expected number of print pages. Then, when a calculation execution command button 808 is selected, a result of calculation is displayed in a calculation result output window 809. FIG. 9B is a diagram for illustrating an example of a terminal screen showing that, as a result of a calculation performed based on the input information set when the setting mode of the number of print pages and the variation consideration mode are set to OFF, the ink in the printer is sufficient. FIG. 9C is a diagram for illustrating a terminal screen showing that, as a result of a calculation performed based on the input information set when the setting mode of the number of print pages and the variation consideration mode are set to OFF, the ink in the printer is not sufficient. The terminal screen of FIG. 9C also shows the quantity of the consumable required to be carried by the user.

Figure 10:
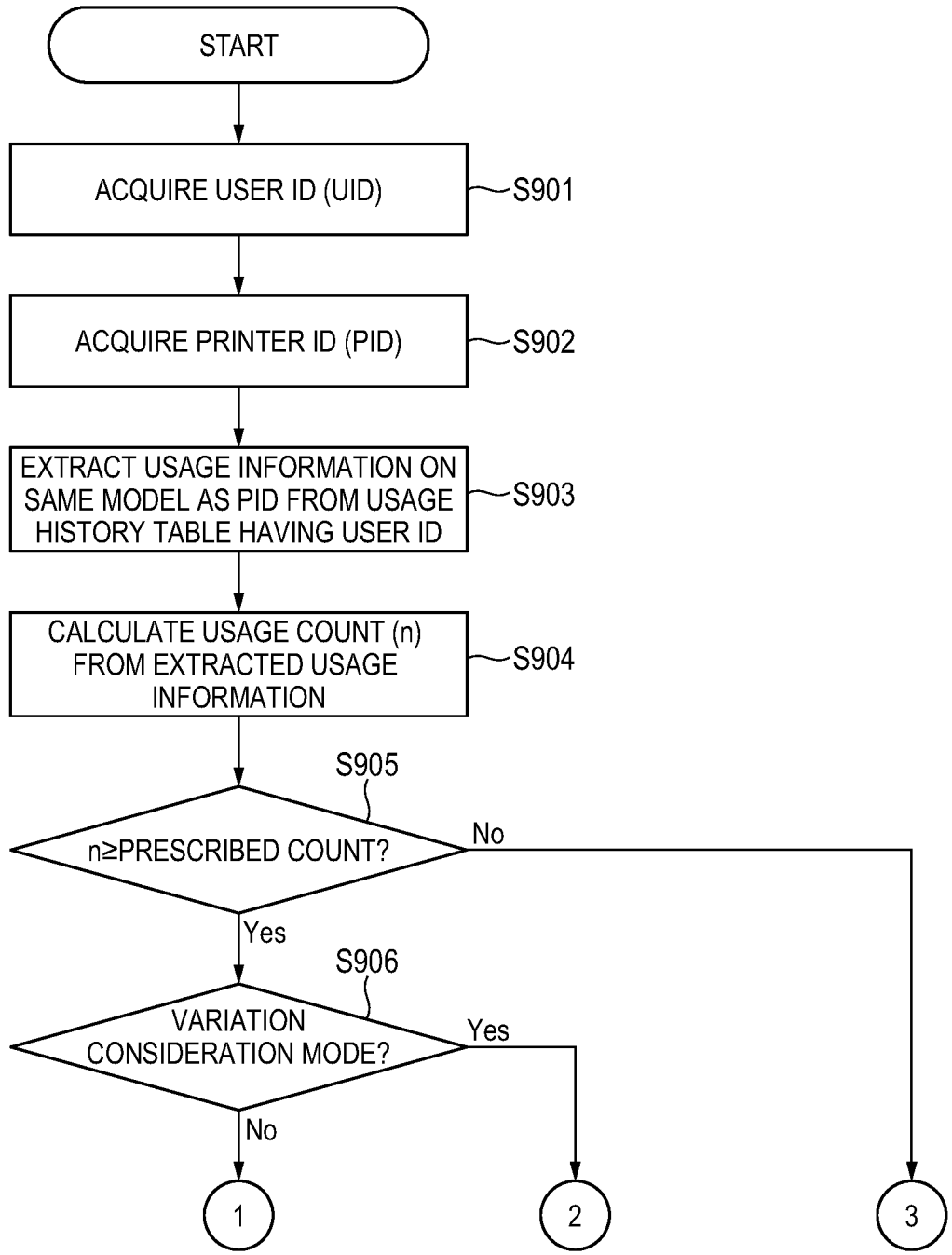
FIG. 10 is a flowchart for illustrating an example of processing performed in a management server.

FIG. 10 is a flowchart for illustrating an example of processing performed in the management server after the user completes the input to the input/output screen illustrated in FIG. 9A to FIG. 9C. That is, FIG. 10 is a flowchart for illustrating an example of processing to be performed after each input illustrated in FIG. 9A to FIG. 9C is completed and the calculation execution command button 808 is selected. The processing is described with reference to the mode illustrated in FIG. 2. The management server 201 extracts the usage history of the user based on the information input from the terminal 203, and determines a calculation method. The terminal 203 transmits the data input to the input unit 218 based on operations by the user from the connector 217 to the management server 201. The input data is the data input by the user to the input/output screen illustrated in FIG. 9A to FIG. 9C. In Step S901, the calculation unit 204 acquires the user ID (UID) from the data transmitted from the terminal 203 via the terminal connector 207. In Step S902, the calculation unit 204 acquires the printer ID (PID) from the data transmitted from the terminal 203 via the terminal connector 207. Step S901 may be performed before Step S902, or Step S902 may be performed before Step S901. Next, in Step S903, the calculation unit 204 retrieves the data address (DA) from a user table (for example, a table shown in FIG. 3) of the database 205 based on the acquired UID. Then, the calculation unit 204 extracts, based on the retrieved DA, the usage information on the same model as that corresponding to the PID acquired in Step S902 from the usage history table of the database 205. In Step S904, the calculation unit 204 calculates, based on the extracted usage information, a usage count (n) of the same model as that corresponding to the PID for the user. In Step S905, the calculation unit 204 determines whether or not the usage count (n) of the user is equal to or more than a prescribed count set in advance. When the usage count (n) of the user is equal to or more than the prescribed count set in advance, in Step S906, the calculation unit 204 determines, based on the data transmitted from the terminal 203 and acquired via the terminal connector 207, whether or not the variation consideration mode has been designated.

<Calculation when Usage Count (n) of User is Equal to or More than Prescribed Count and Variation Consideration Mode is OFF>

Figure 11:
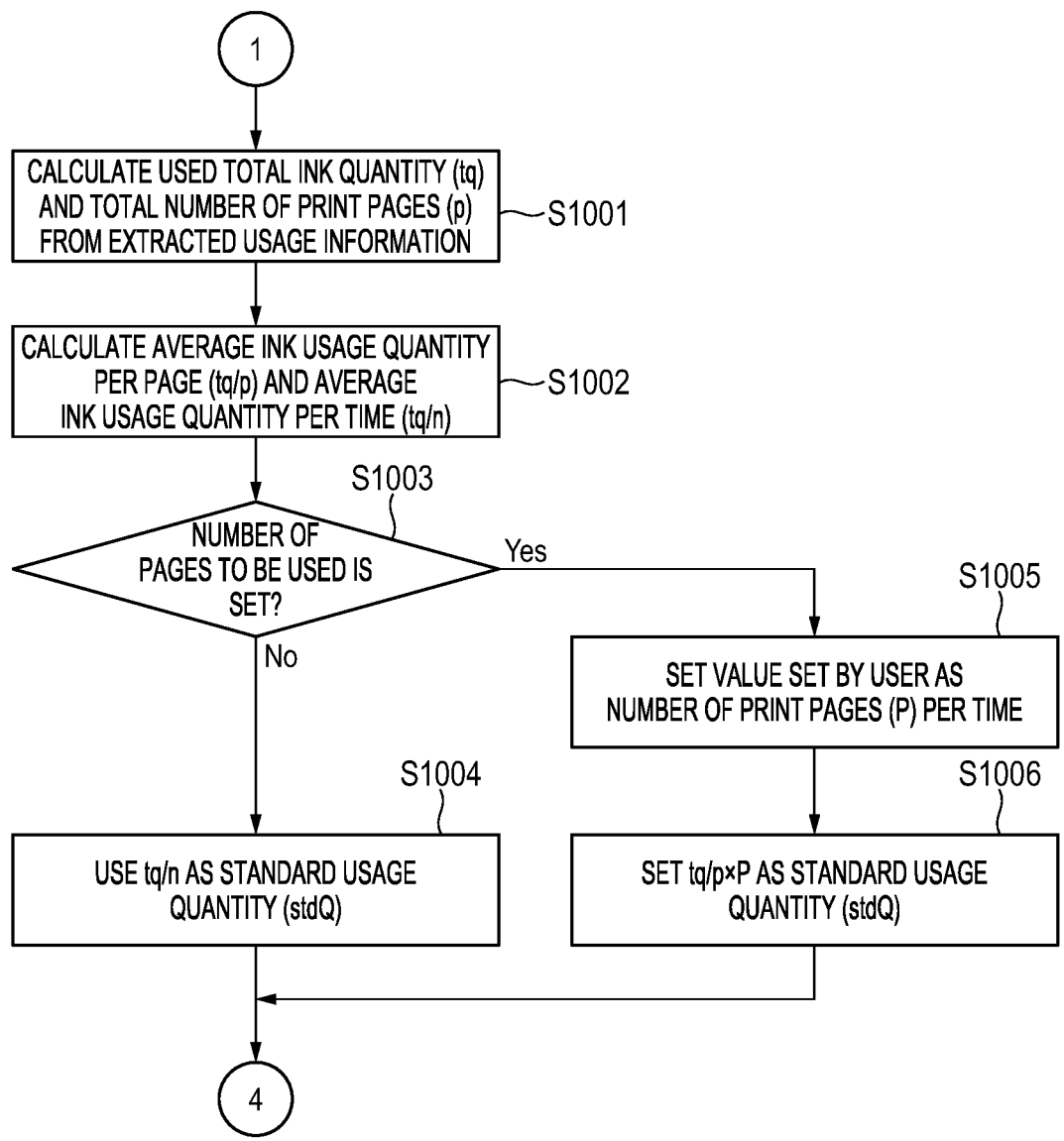
FIG. 11 is a flowchart for illustrating an example of processing performed in the management server.

FIG. 11 is a flowchart for illustrating an example of processing performed in the management server when the usage count (n) of the user is equal to or more than the prescribed count and the variation consideration mode has not been designated. When the past usage count (n) of the user is equal to or more than the prescribed count and the variation consideration mode is OFF, the management server 201 predicts the ink quantity to be used by the user this time by performing the following processing. In Step S1001, the calculation unit 204 calculates, based on the usage information extracted from the usage history table of the database 205, a total ink quantity (tq) used until now by the same model as that corresponding to the PID and a total number of print pages (p). In Step S1002, the calculation unit 204 calculates an average ink usage quantity per page (tq/p) and an average ink usage quantity per time (tq/n). In Step S1003, the calculation unit 204 determines whether a setting mode of the number of pages to be used (setting mode of the number of print pages) is ON or OFF based on data acquired via the terminal connector 207. When the setting mode of the number of pages to be used is set to OFF, in Step S1004, the calculation unit 204 sets "tq/n" as the standard usage quantity (stdQ) of the ink, that is, as the consumable quantity (ink usage quantity) to be used when the printer is used once by the user. When the setting mode of the number of pages to be used is set to ON, in Step S1005, the calculation unit 204 sets the value of the expected number of print pages, which is input by the user operating the input/output screen displayed on the terminal 203, as a number of print pages (P) per time. In Step S1006, the calculation unit 204 sets a product (tq/p×P) of the average ink usage quantity per page (tq/p) and the number of print pages (P) per time set in Step S1006 as the standard usage quantity (stdQ) of the ink.

In this way, the management server 201 calculates the required ink quantity regardless of whether or not the expected number of print pages is set. Therefore, the user can grasp the usage quantity of the ink corresponding to the case.

<Calculation when Usage Count (n) of User is Equal to or More than Prescribed Count and Variation Consideration Mode is ON>

Figure 12:
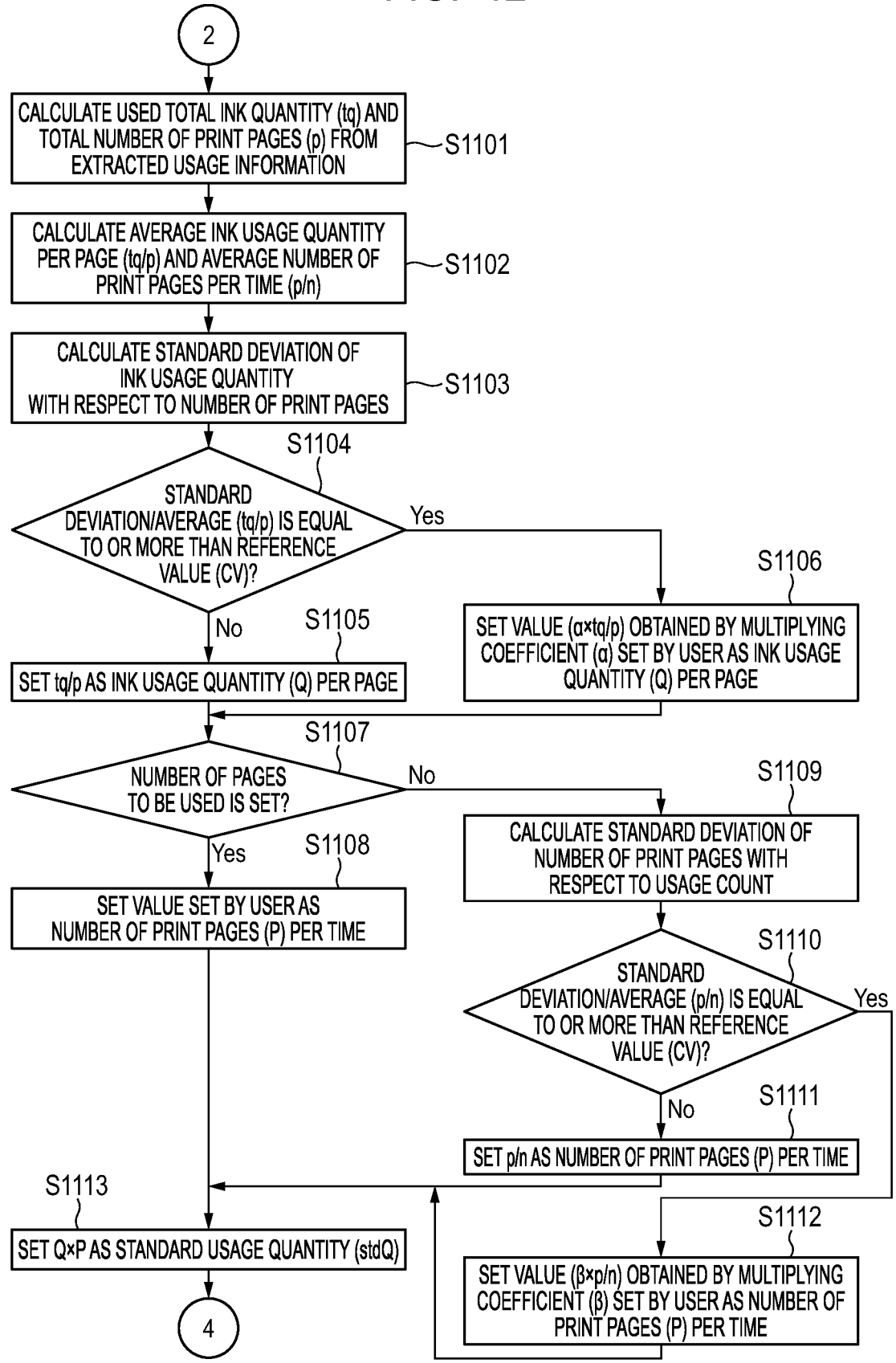
FIG. 12 is a flowchart for illustrating an example of processing performed in the management server.

FIG. 12 is a flowchart for illustrating an example of processing performed in the management server when the usage count (n) of the user is equal to or more than the prescribed count and the variation consideration mode has been designated. When the past usage count (n) of the user is equal to or more than the prescribed count and the variation consideration mode is ON, the management server 201 predicts the ink quantity to be used by the user this time by performing the following processing. In Step S1101, the calculation unit 204 calculates, based on the usage information extracted from the usage history table of the database 205, the total ink quantity (tq) used until now by the same model as that corresponding to the PID and the total number of print pages (p). In Step S1102, the calculation unit 204 calculates the average ink usage quantity per page (tq/p) and an average number of print pages per time (p/n). In Step S1103, the calculation unit 204 calculates a standard deviation of the ink usage quantity with respect to the number of print pages. In Step S1104, the calculation unit 204 determines whether or not a standard deviation/average ink usage quantity (tq/p) is equal to or more than a reference value (CV). When the standard deviation/average ink usage quantity (tq/p) is less than CV, in Step S1105, the calculation unit 204 sets "tq/p" as the ink usage quantity (Q) per page. Meanwhile, when the standard deviation/average ink usage quantity (tq/p) is equal to or more than CV, in Step S1106, the calculation unit 204 multiplies the ink quantity correction coefficient (α) set in the user table by "tq/p," and sets the obtained value (α×tq/p) as the ink usage quantity (Q) per page. Next, in Step S1107, the calculation unit 204 determines whether the setting of the number of pages to be used (setting mode of the number of print pages) is ON or OFF.

When the setting of the number of pages to be used is set to ON, in Step S1108, the calculation unit 204 sets the value of the expected number of print pages, which is input by the user operating the input/output screen displayed on the terminal 203, as the number of print pages (P) per time. When the setting of the number of pages to be used is set to OFF, in Step S1109, the calculation unit 204 calculates a standard deviation of the number of print pages with respect to the usage count. In Step S1110, the calculation unit 204 determines whether or not standard deviation/average number of print pages (p/n) is equal to or more than the reference value (CV). When the standard deviation/average number of print pages (p/n) is less than CV, in Step S1111, the calculation unit 204 sets "p/n" as the number of print pages (P) per time. Meanwhile, when the standard deviation/average number of print pages (p/n) is equal to or more than CV, in Step S1112, the calculation unit 204 multiplies the number of print pages correction coefficient (β) set in the user table by "p/n," and sets the obtained value (β×p/n) as the number of print pages (P) per time. The calculation unit 204 sets a product "Q×P" of the set ink usage quantity (Q) per page and the number of print pages (P) per time as the standard usage quantity (stdQ) of the ink, that is, as the quantity of the consumable to be used when the printer is used once by the user (Step S1113). The number of print pages (P) per time is set in Step S1108 or Step S1111.

<Calculation when Usage Count (n) of User is Less than Prescribed Count>

Figure 13:
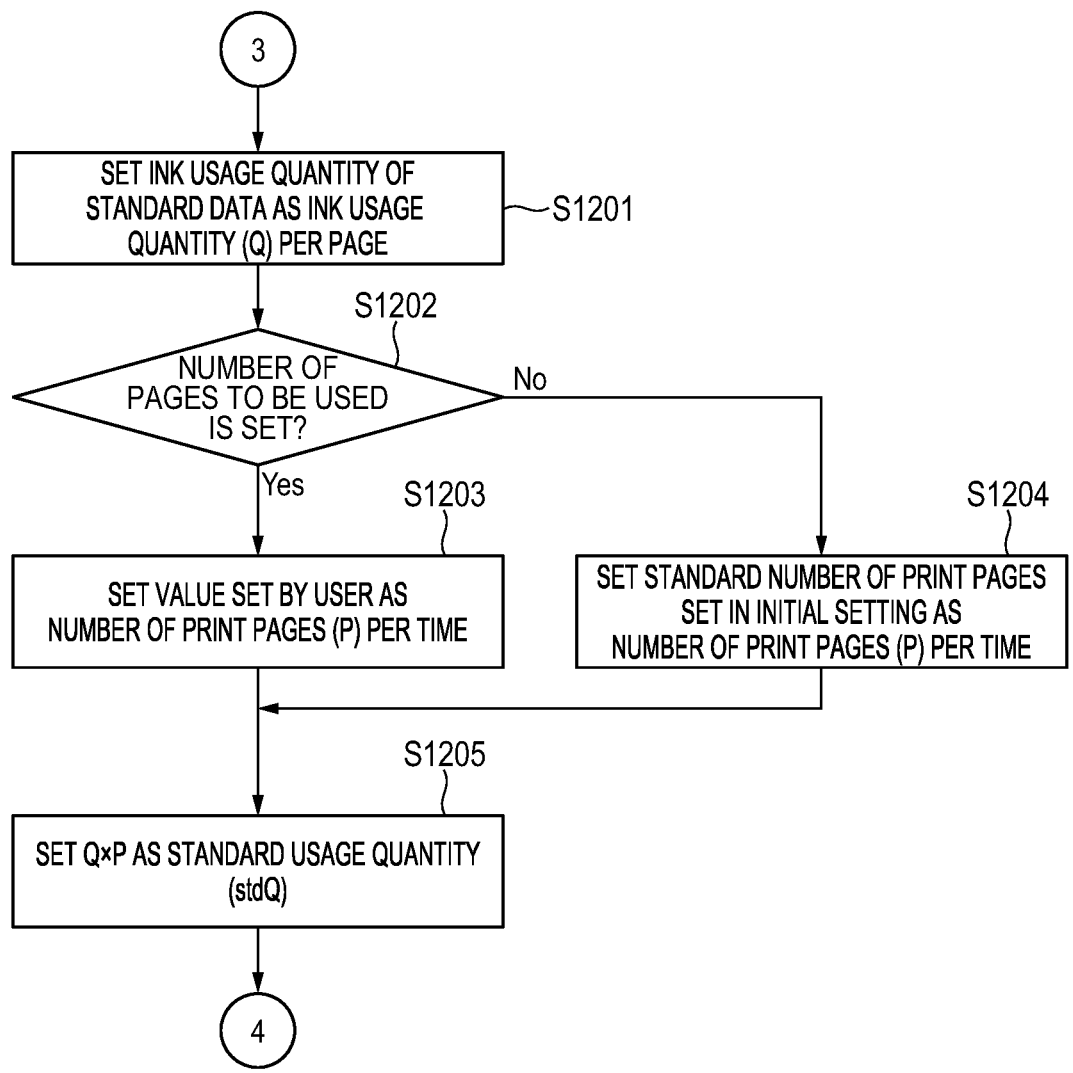
FIG. 13 is a flowchart for illustrating an example of processing performed in the management server.

FIG. 13 is a flowchart for illustrating an example of processing performed in the management server when the usage count (n) of the user is less than the prescribed count. When the past usage count (n) of the user is less than the prescribed count, the management server 201 predicts the ink quantity to be used by the user this time by performing the following processing. In Step S1201, the calculation unit 204 sets the ink usage quantity of the standard data set in advance as the ink usage quantity (Q) per page. In Step S1202, the calculation unit 204 determines whether the setting of the number of pages to be used (setting mode of the number of print pages) is ON or OFF. When the setting of the number of pages to be used is set to ON, in Step S1203, the calculation unit 204 sets the value of the expected number of print pages, which is input by the user operating the input/output screen displayed on the terminal 203, as the number of print pages (P) per time. When the setting of the number of pages to be used is set to OFF, in Step S1204, the calculation unit 204 sets the standard number of print pages, which is set during the initial setting, as the number of print pages (P) per time. Next, the calculation unit 204 sets the product "Q×P" of the ink usage quantity (Q) per page and the number of print pages (P) per page as the standard usage quantity (stdQ) of the ink, that is, as the quantity of the consumable to be used when the printer is used once by the user (Step S1205). The number of print pages (P) per time is set in Step S1203 or Step S1204.

<Notification to User of Required Number of Consumables to be Carried from Determination of Standard Usage Quantity>

Figure 14:
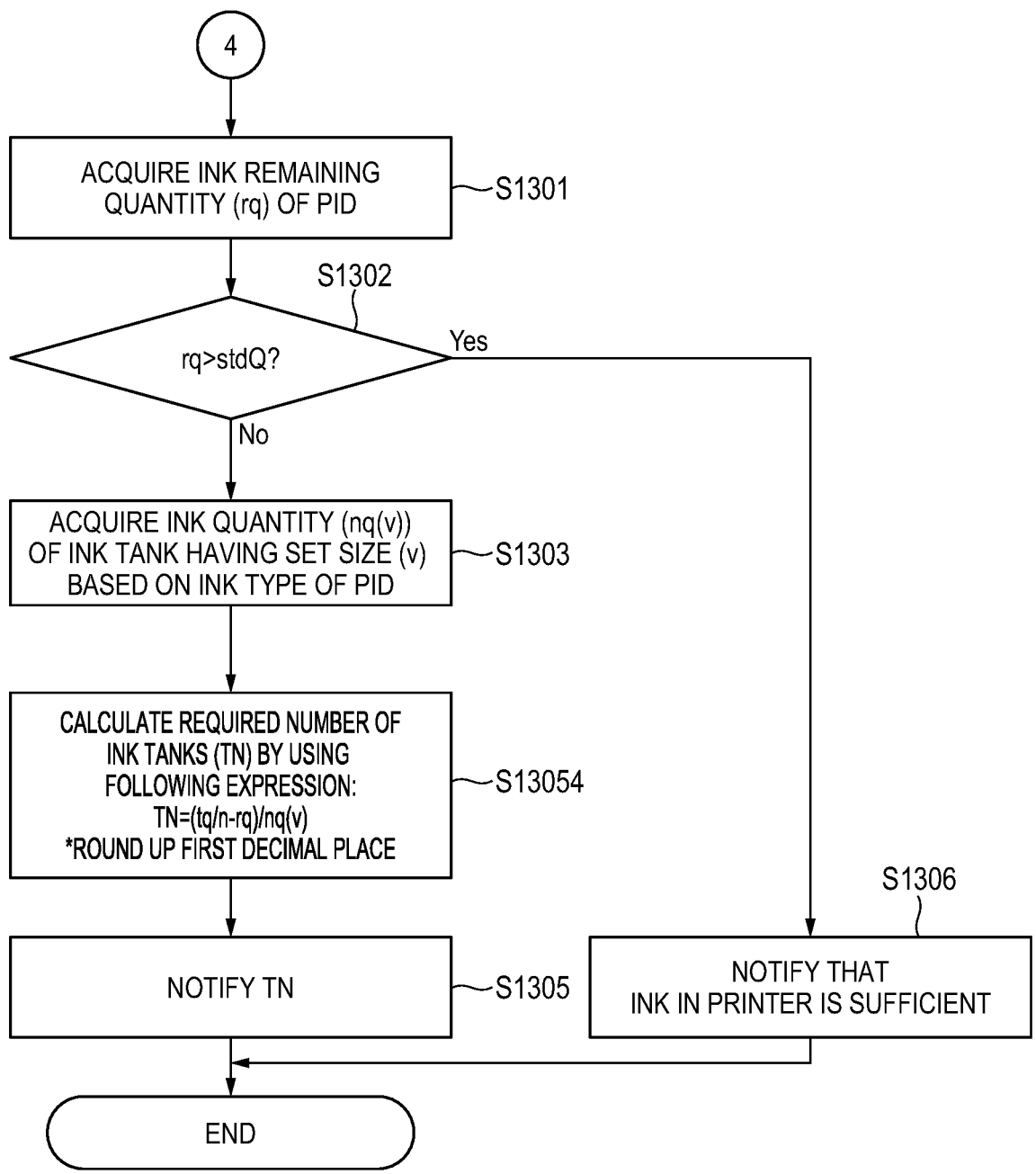
FIG. 14 is a flowchart for illustrating an example of processing performed in the management server.

FIG. 14 is a flowchart for illustrating an example of processing performed in the management server from after the standard usage quantity is set until notification of the required consumable quantity to be carried. In Step S1301, the calculation unit 204 acquires the ink remaining quantity (rq) of the PID from the printer table stored in the database 205 based on the PID of the corresponding printer. In Step S1302, the calculation unit 204 compares "rq" with "stdQ." When "rq" is equal to or less than "stdQ," the ink contained in the ink tank which is currently set in the mobile printer 202 is not sufficient, and therefore the calculation unit 204 calculates the required number of ink tanks. In Step S1303, the calculation unit 204 acquires the ink quantity (nq(v)) of an ink tank having the set size (v) based on the ink type of the PID from the ink tank table of the database 205. In Step S1304, the calculation unit 204 calculates the required number of ink tanks (TN) by using Expression 1.

$$TN=(tq/n-rq)/nq(v) \quad \text{(Expression 1)}$$

In Step S1305, the terminal connector 207 transmits information indicating TN calculated by the calculation unit 204 to the terminal 203, and the terminal 203 notifies the user of TN by using the output unit 219. Meanwhile, when "rq" is larger than "stdQ," the ink contained in the ink tank currently set in the mobile printer 202 is sufficient. Therefore, in Step S1306, the terminal connector 207 transmits information indicating that fact to the terminal 203, and the terminal 203 uses the output unit 219 to notify the user that the ink in the printer is sufficient.

<Setting of Printer State (State) after Output of Calculation Result>

When the user uses the printer having the PID input based on an operation on the input/output screen displayed on the terminal 203, the terminal 203 selects a usage notification button 810 illustrated in FIG. 9A to notify the management server 201 that the printer having the PID is to be used. The management server 201 receives the notification from the terminal 203, and the calculation unit 204 accesses the database 205 and uses the data transmitted from the terminal 203 to change the PID state (State) in the printer table from "returned" to "rented." Then, the calculation unit 204 writes the UID in the user (User). Next, the calculation unit 204 adds an association (row) to the usage history table stored in the data address (DA) associated with the user ID (UID) in the user table. Then, the calculation unit 204 writes the PID, the Ptype, and the ink tank size input in the ink tank size input window 804 illustrated in FIG. 9A in the used model ID (UPID), the used model type (UPtype), and the ink tank size (my), respectively. When the user selects a cancellation notification button 811 illustrated in FIG. 9A, the management server 201 does not access the database 205, and the terminal 203 clears the input information except for the information input to the user ID input window 802 of the input/output screen illustrated in FIG. 9A. The user can start over from the input of the PID, and can easily select a printer having a desired remaining quantity of ink.

When the quantity of the consumable used per time by the user using the printer is unclear, there is a problem in that it is difficult to predict the required number of the consumable to be carried. In response to this problem, the system performs the processing in accordance with the flowcharts illustrated in FIG. 10, FIG. 11, and FIG. 14. Performing this processing has the effect that the user can know the quantity of the consumable to be used and the required number of the consumable to be carried without the user being aware of how much he or she has printed each time the user uses the printer. Further, when there is a variation in the quantity of the consumable used per time by the user, there is a problem in that it is difficult to predict the required number of the consumable to be carried by simply calculating the average value. In response to this problem, the system performs the processing in accordance with the flowcharts illustrated in FIG. 10, FIG. 12, and FIG. 14. Performing this processing has the effect that the user can set, in consideration of the variation, the quantity of the consumable to be used and an increase amount or a reduction amount from the average value of the required number of the consumable to be carried. Moreover, when a user who is not registered in the user table uses the system, or when a user uses the system for the first time, or when the usage count is small, there is a problem in that it is difficult to accurately predict the required number of the consumable to be carried. In response to this problem, the system performs the processing in accordance with the flowcharts illustrated in FIG. 10, FIG. 13, and FIG. 14. Performing this processing has the effect that the user can know the approximate required number of the consumable to be carried. Specifically, the management server 201 calculates the quantity of the consumable to be used and the required number of the consumable to be carried based on known standard data. The user can compare the data to be printed with the standard data and estimate how much the calculated consumable quantity and the required number of the consumable to be carried are different from the actual value.

<Communication of Consumable Management System after Printer is Used>

Figure 15:
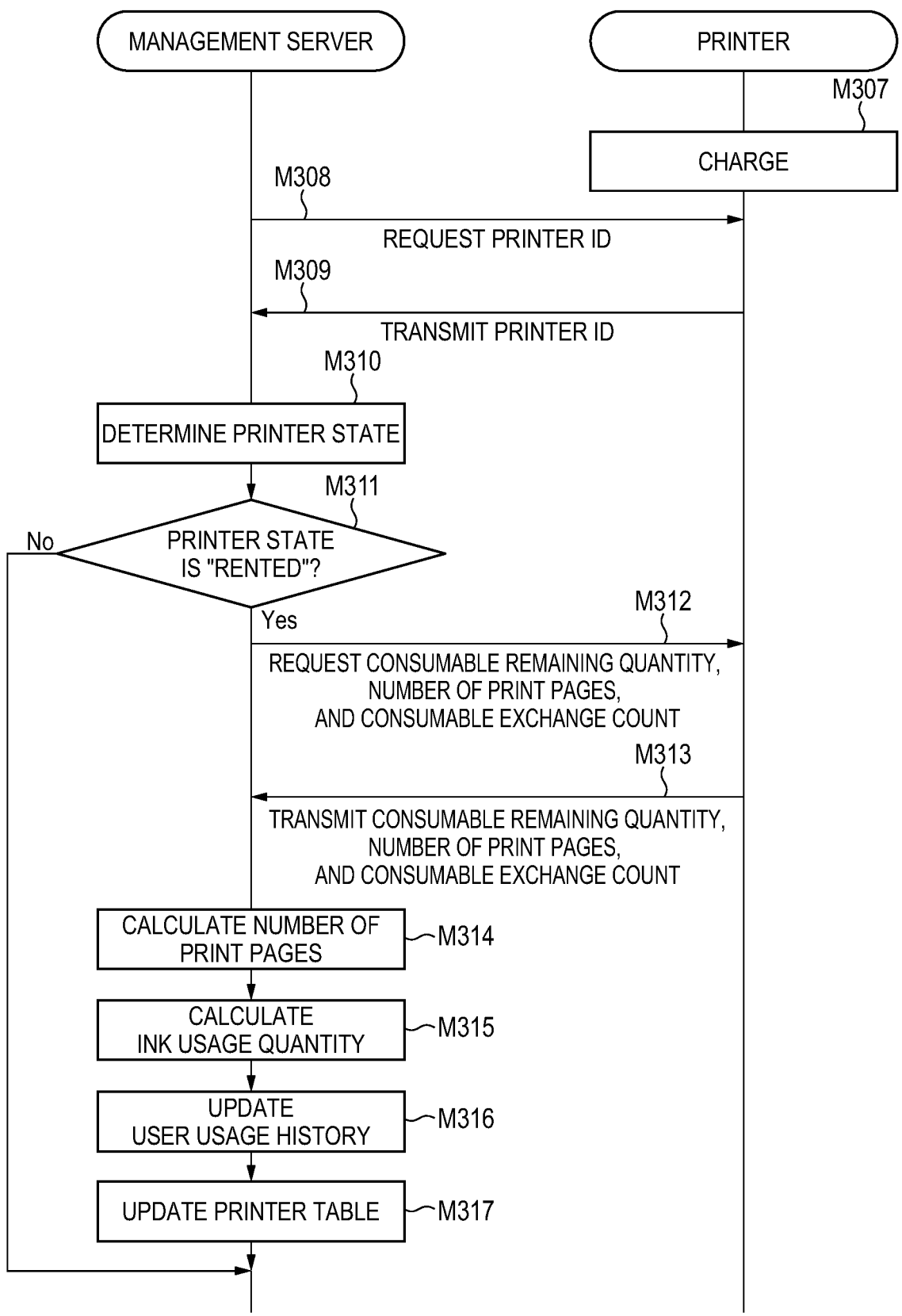
FIG. 15 is a sequence diagram for illustrating an example of processing performed in the management server and a printer.

FIG. 15 is a sequence diagram for illustrating an example of processing performed in the management server 201 and the printer after the user uses the printer. The management server 201 automatically communicates to and from the printer in a communicable state. When the user has finished using the printer, the user connects the printer to a charger to start charging the printer (Step M307). In this state, the printer can communicate to and from the management server 201. The management server 201 requests the printer ID from the printer being charged (Step M308). In response to the request, the printer transmits the printer ID to the management server 201 (Step M309). As a result, the management server 201 acquires the printer ID. Then, the management server 201 accesses the printer table stored in the database 205, and determines whether or not the printer state (State) of the printer associated with the printer ID (PID) is "rented" (Step M310 and Step M311). When the printer is "rented," the management server 201 requests from the printer the ink remaining quantity (consumable remaining quantity), the number of print pages, and the ink tank exchange count (consumable exchange count) (Step M312). In response to the request, the printer transmits the ink remaining quantity, the number of print pages, and the ink tank exchange count to the management server 201 (Step M313). As a result, the management server 201 acquires the ink remaining quantity, the number of print pages, and the ink tank exchange count. The management server 201 calculates, as the number of print pages this time by the user, the difference between the cumulative number of print pages (TP) in the printer table and the number of print pages (Step M314). Next, the management server 201 accesses the database 205 and acquires from the printer table the user ID of the user who used the printer. The management server 201 refers to the usage history table of the acquired user ID, and acquires the carried ink tank size (mv) from the latest row (nc) (association) having a used model ID matching the PID. The ink usage quantity by the user this time is calculated based on the ink remaining quantity, the ink tank exchange count, and the ink tank size (my) (Step M315). The management server 201 records the number of print pages, ink usage quantity, and date and time of use by the user this time as the usage history of the user in the row "nc" of the usage history table of the user (Step M316). Next, the management server 201 sets the state (State) in the printer table to "returned" (Step M317). In this embodiment, charging of the printer is used as a method of notifying the management server 201 that the printer has been used. Such a method is not required to be used in cases in which the management server 201 can communicate to and from the printer and can recognize that the printer has been used.

When a plurality of users use a plurality of shared mobile printers, it has been difficult to accurately predict the consumable quantity required to be carried by each user. In the embodiment described above, the management system manages the usage history of each user and selects an appropriate prediction method depending on the usage situation. As a result, the user can know the optimal consumable quantity required to be carried without being aware of that fact.

In the embodiment described above, all of the usage information on the same model in the usage history of the user is extracted. However, when the user has a plurality of different usage patterns, a new parameter may be added to the usage history of the user, and the usage history to be extracted may be narrowed down in accordance with each pattern. Specifically, in the case of a user who has two usage patterns, namely, a pattern A for printing hundreds of pages in color and a pattern B for printing dozens of monochrome pages, when the user inputs information to the terminal, the user also inputs the usage pattern. The management system extracts the usage history of the same model and the same pattern, and predicts the required consumable quantity.

Further, in the embodiment described above, the management server 201 calculates the ink usage quantity based on the difference in the ink remaining quantity of the printer and the ink tank exchange count. However, the management server 201 may acquire from the printer the ink quantity used for maintenance and manage that ink quantity separately from the ink quantity consumed by printing. Specifically, when the required number of ink tanks is calculated, the calculation may be performed by taking into account the quantity consumed in maintenance which is likely to be performed during use by the user based on the ink usage quantity by the user in printing and the last date and time of use of the printer.

Moreover, in the embodiment described above, the required number of ink tanks to be carried is calculated by managing the ink usage quantity for each color of the ink tanks. However, depending on the model, a different method may be employed. For example, in the case of a model on which a three-color integrated ink tank is mounted, there may be employed a method in which, among the three color ink tanks, the ink tank having the largest required number is notified.

Figure 16:
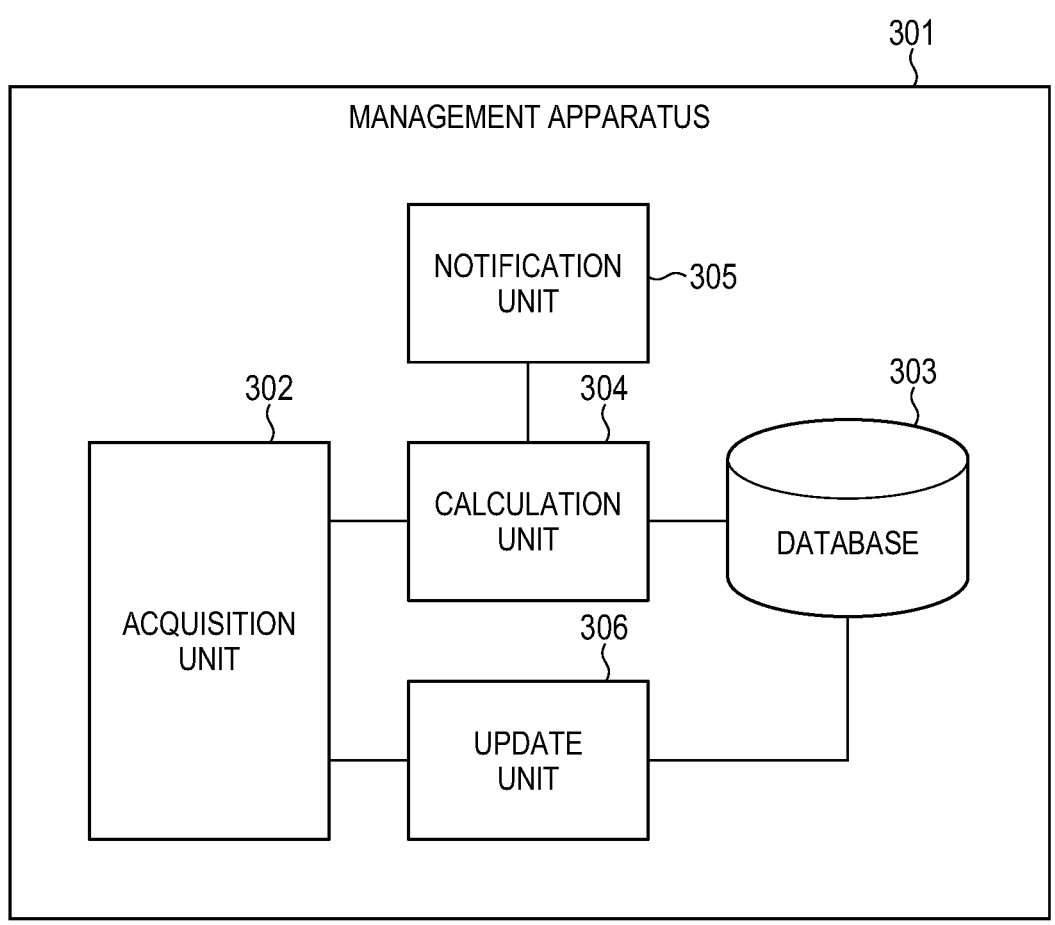
FIG. 16 is diagram for illustrating an outline of a management apparatus of the present disclosure.

FIG. 16 is a diagram for illustrating an example of an outline of the management apparatus of the present disclosure. A management apparatus 301 illustrated in FIG. 16 corresponds to the management server 201 illustrated in FIG. 2. As illustrated in FIG. 16, the management apparatus 301 includes an acquisition unit 302, a database 303, a calculation unit 304, a notification unit 305, and an updating unit 306. The acquisition unit 302 and the notification unit 305 correspond to the communicator 206 illustrated in FIG. 2. The calculation unit 304 and the updating unit 306 correspond to the calculation unit 204 illustrated in FIG. 2. The database 303 corresponds to the database 205 illustrated in FIG. 2.

The acquisition unit 302 is configured to acquire from the image forming apparatus, which is a printer, remaining-quantity information indicating the remaining quantity of a consumable included in the image forming apparatus. At this time, the acquisition unit 302 acquires the remaining-quantity information by transmitting to the image forming apparatus a request signal requesting the remaining-quantity information. The acquisition unit 302 acquires information on the user transmitted from the communication terminal. The database 303 stores the tables shown in FIG. 3, FIG. 4, FIG. 5, and FIG. 6. The calculation unit 304 is configured to read a usage history table from the database 303 based on the user identification information (user ID) transmitted from the communication terminal. Further, the calculation unit 304 calculates, based on the information of the read usage history table, a predicted usage quantity of the consumable in an image forming apparatus having the apparatus identification information (printer ID) transmitted from the communication terminal. Moreover, the calculation unit 304 reads the remaining-quantity information from the database 303 based on the apparatus identification information (printer ID) transmitted from the communication terminal. Then, the calculation unit 304 generates required information on the consumable based on the read remaining-quantity information and the calculated predicted usage quantity. At this time, when the remaining quantity indicated by the remaining-quantity information is larger than the predicted usage quantity, the calculation unit 304 generates required information indicating that the consumable is not required to be added. In addition, when the remaining quantity indicated by the remaining-quantity information is equal to or less than the predicted usage quantity, the calculation unit 304 generates required information indicating that a quantity of the consumable equal to a difference between the remaining quantity and the predicted usage quantity is required. The calculation unit 304 identifies the usage history stored in the database 303 in association with the user identification information transmitted from the communication terminal. Then, in the identified usage history, when the usage count of the image forming apparatus identified by the apparatus identification information transmitted from the communication terminal is larger than a predetermined threshold value, the calculation unit 304 calculates the predicted usage quantity based on the past ink usage quantity included in the usage history table. At this time, when the user has operated the communication terminal to input (designate) the number of pages to be formed by the image forming apparatus, the calculation unit 304 calculates the predicted usage quantity based on the designated number of pages, and the number of pages formed in the past and the past ink usage quantity, which are included in the usage history table. Further, the calculation unit 304 calculates the predicted usage quantity based on a first correction value obtained by multiplying an ink quantity correction coefficient (first correction coefficient) set in advance for each user by the past ink usage quantity. At this time, the calculation unit 304 calculates the first correction value obtained by multiplying the ink quantity correction coefficient set in advance for each user by the past ink usage quantity. The calculation unit 304 also calculates a second correction value obtained by multiplying a number of printed pages correction coefficient (second correction coefficient) set in advance for each user by the number of pages formed in the past. The calculation unit 304 calculates the predicted usage quantity based on the first and second correction values. The notification unit 305 is configured to transmit the required information generated by the calculation unit 304 to the communication terminal to notify the communication terminal of the required information. At this time, the notification unit 305 notifies the required information to the communication terminal which transmitted the user identification information and the apparatus identification information. The updating unit 306 is configured to update the database 303 based on the remaining-quantity information acquired by the acquisition unit 302.

In this way, even when a plurality of users having different usage methods share a certain mobile printer, the required consumable quantity to be carried can be presented to each user.

In the above description, there has been described a case in which each function (processing) is allocated to a certain component, but the allocation of the functions is not limited to the example described above. Further, the modes described above are merely examples, and the present disclosure is not limited thereto.

The processing to be performed by each of the components described above may be performed by logic circuits produced in accordance with the purpose. Further, a program in which the processing content is described as a procedure may be recorded on a recording medium that can be read by an apparatus (for example, management apparatus 301; hereinafter referred to as "information processing apparatus") including each of the components, and the information recording apparatus may be configured to read and execute the program recorded on the recording medium. The "recording medium that can be read by the information processing apparatus" may be removable recording medium, for example, a floppy (trademark) disk, a magneto-optical disc, a digital versatile disc (DVD), a compact disc (CD), a Blu-ray (trademark) disc, or a universal serial bus (USB) memory, or may be a memory, for example, a read only memory (ROM) or a random access memory (RAM), or a hard disk drive (HDD) built in the information processing apparatus. The program recorded on the recording medium is read by a CPU arranged in the information processing apparatus, and the same processing as described above is performed under the control of the CPU. The CPU operates as a computer configured to execute a program read from the recording medium on which the program is recorded.

According to the present disclosure, each of a plurality of users who use the image forming apparatus can be notified about a consumable included in the image forming apparatus in a manner that suits each user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-011513, filed Jan. 28, 2020, which is hereby incorporated by reference herein in its entirety.

What is claimed is:

1. A management apparatus comprising:
at least one processor causing the management apparatus to act as:
an acquisition unit configured to acquire, from an image forming apparatus, remaining-quantity information indicating a remaining quantity of ink in an ink tank included in the image forming apparatus;
a database configured to store the remaining-quantity information acquired by the acquisition unit and apparatus identification information for identifying the image forming apparatus in association with each other, and to store user identification information for identifying a user and a usage history of the image forming apparatus by the user in association with each other;
a determination unit configured to determine whether or not the remaining quantity indicated by the remaining-quantity information is equal to or less than a standard usage quantity;
a deciding unit configured to decide a number of the ink tanks in association with externally-designated user identification information, based on the usage history in association with the externally-designated user information, when the determination unit determines that the remaining quantity indicated by the remaining-quantity information is equal to or less than a standard usage quantity; and
a notification unit configured to notify the decided number of the ink tanks as a number of the ink tanks that are required to be carried by the user.

2. The management apparatus according to claim 1, wherein the database is configured to include a usage count of each image forming apparatus in the usage history to store the usage history, and
wherein the determination unit is configured to calculate, when the usage count of an image forming apparatus having the externally-designated apparatus identification information assigned thereto is larger than a predetermined threshold value in the usage history stored in association with the externally-designated user identification information in the database, the standard usage quantity based on a past ink usage quantity included in the usage history.

3. The management apparatus according to claim 2, wherein the determination unit is configured to calculate, when the number of pages to be formed by the image forming apparatus has been externally designated, the standard usage quantity based on the designated number of pages, and the number of pages formed in the past and the past ink usage quantity which are included in the usage history.

4. The management apparatus according to claim 2, wherein the determination unit is configured to calculate the standard usage quantity based on a first correction value obtained by multiplying a first correction coefficient set in advance for each user by the past ink usage quantity.

5. The management apparatus according to claim 1, further comprising an updating unit configured to update the database based on the remaining-quantity information acquired by the acquisition unit.

6. A management control method comprising:
acquiring, from an image forming apparatus, remaining-quantity information indicating a remaining quantity of ink in an ink tank included in the image forming apparatus;
storing the remaining-quantity information acquired by the acquiring in a database in association with apparatus identification information for identifying the image forming apparatus, wherein the database also stores user identification information for identifying a user in association with a usage history of the image forming apparatus by the user;
determining whether or not the remaining quantity indicated by the remaining-quantity information is equal to or less than a standard usage quantity;
deciding a number of the ink tanks in association with externally-designated user identification information, based on the usage history in association with the externally-designated user information, when the determining determines that the remaining quantity indicated by the remaining-quantity information is equal to or less than a standard usage quantity; and
notifying the decided number of the ink tanks as a number of the ink tanks that are required to be carried by the user.

7. The management control method according to claim 6, wherein the database includes a usage count of each image forming apparatus in the usage history to store the usage history, and
wherein the determining comprises calculating the standard usage quantity, when the usage count of an image forming apparatus having the externally-designated apparatus identification information assigned thereto is larger than a predetermined threshold value in the usage history stored in association with the externally-designated user identification information in the database, based on a past ink usage quantity included in the usage history.

8. The management control method according to claim 7, wherein the determining comprises calculating the standard usage quantity, when the number of pages to be formed by the image forming apparatus has been externally designated, based on the designated number of pages, and the number of pages formed in the past and the past ink usage quantity which are included in the usage history.

9. The management control method according to claim 7, wherein the determining comprises calculating the standard usage quantity based on a first correction value obtained by multiplying a first correction coefficient set in advance for each user by the past ink usage quantity.

10. A non-transitory computer-readable medium storing program code for a management control method, wherein the management control method comprises:
acquiring, from an image forming apparatus, remaining-quantity information indicating a remaining quantity of ink in an ink tank included in the image forming apparatus;
storing the remaining-quantity information acquired by the acquiring in a database in association with apparatus identification information for identifying the image forming apparatus, wherein the database also stores user identification information for identifying a user in association with a usage history of the image forming apparatus by the user;
determining whether or not the remaining quantity indicated by the remaining-quantity information is equal to or less than a standard usage quantity;
deciding a number of the ink tanks in association with externally-designated user identification information, based on the usage history in association with the externally-designated user information, when the determining determines that the remaining quantity indicated by the remaining-quantity information is equal to or less than a standard usage quantity; and
notifying the decided number of the ink tanks as a number of the ink tanks that are required to be carried by the user.

11. The non-transitory computer-readable medium according to claim 10,
wherein the database includes a usage count of each image forming apparatus in the usage history to store the usage history, and
wherein the determining comprises calculating the standard usage quantity, when the usage count of an image forming apparatus having the externally-designated apparatus identification information assigned thereto is larger than a predetermined threshold value in the usage history stored in association with the externally-designated user identification information in the database, based on a past ink usage quantity included in the usage history.

12. The non-transitory computer-readable medium according to claim 11, wherein the determining comprises calculating the standard usage quantity, when the number of pages to be formed by the image forming apparatus has been externally designated, based on the designated number of pages, and the number of pages formed in the past and the past ink usage quantity which are included in the usage history.

13. The non-transitory computer-readable medium according to claim 11, wherein the determining comprises calculating the standard usage quantity based on a first correction value obtained by multiplying a first correction coefficient set in advance for each user by the past ink usage quantity.

* * * * *